May 15, 1945.    J. R. CLARK    2,376,121
EXTENSIBLE SUSPENSIONS FOR DRAWERS AND THE LIKE
Filed Aug. 15, 1941    5 Sheets-Sheet 1
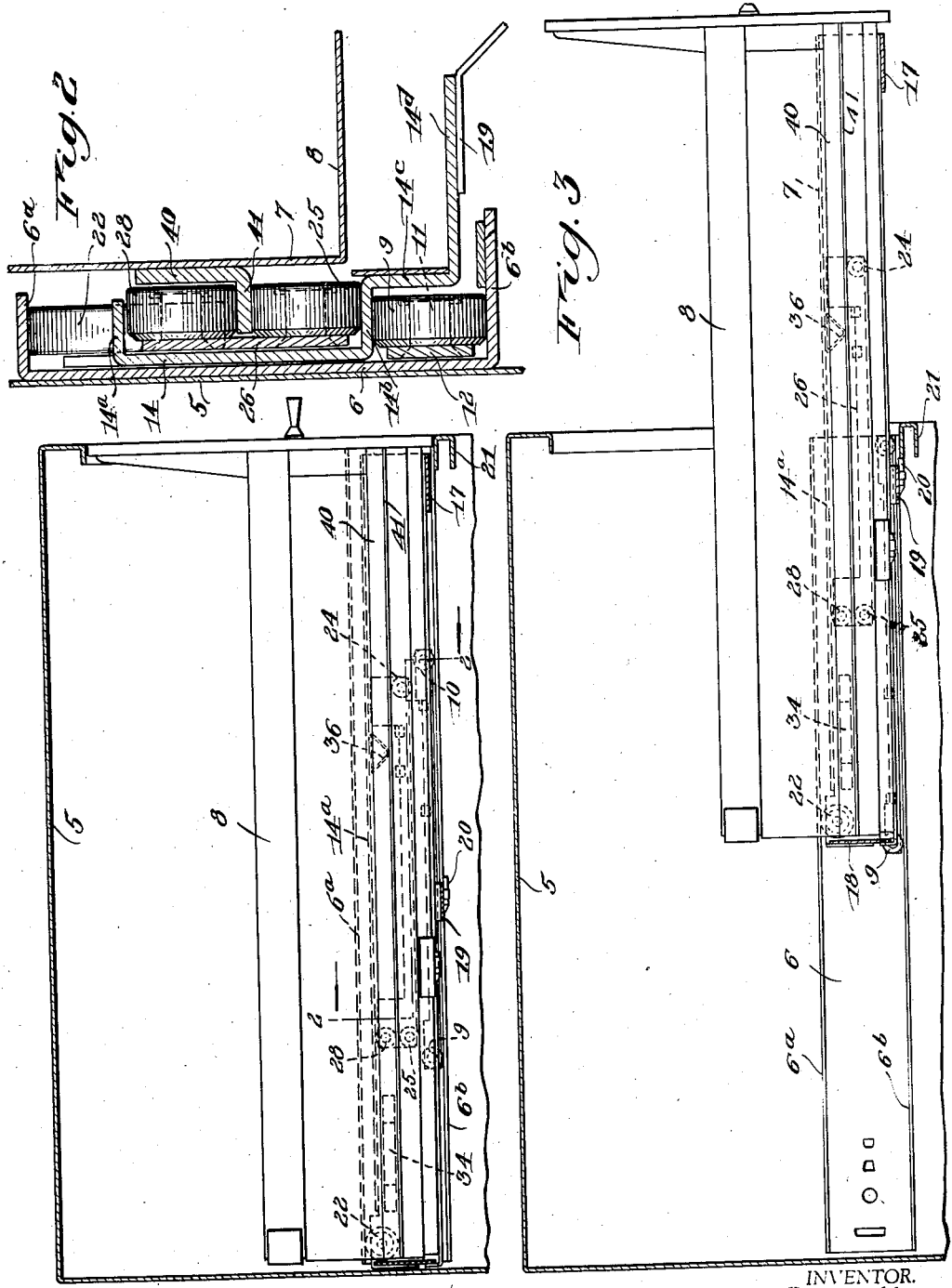
INVENTOR.
James R. Clark
BY D. Clyde Jones
his ATTORNEY.

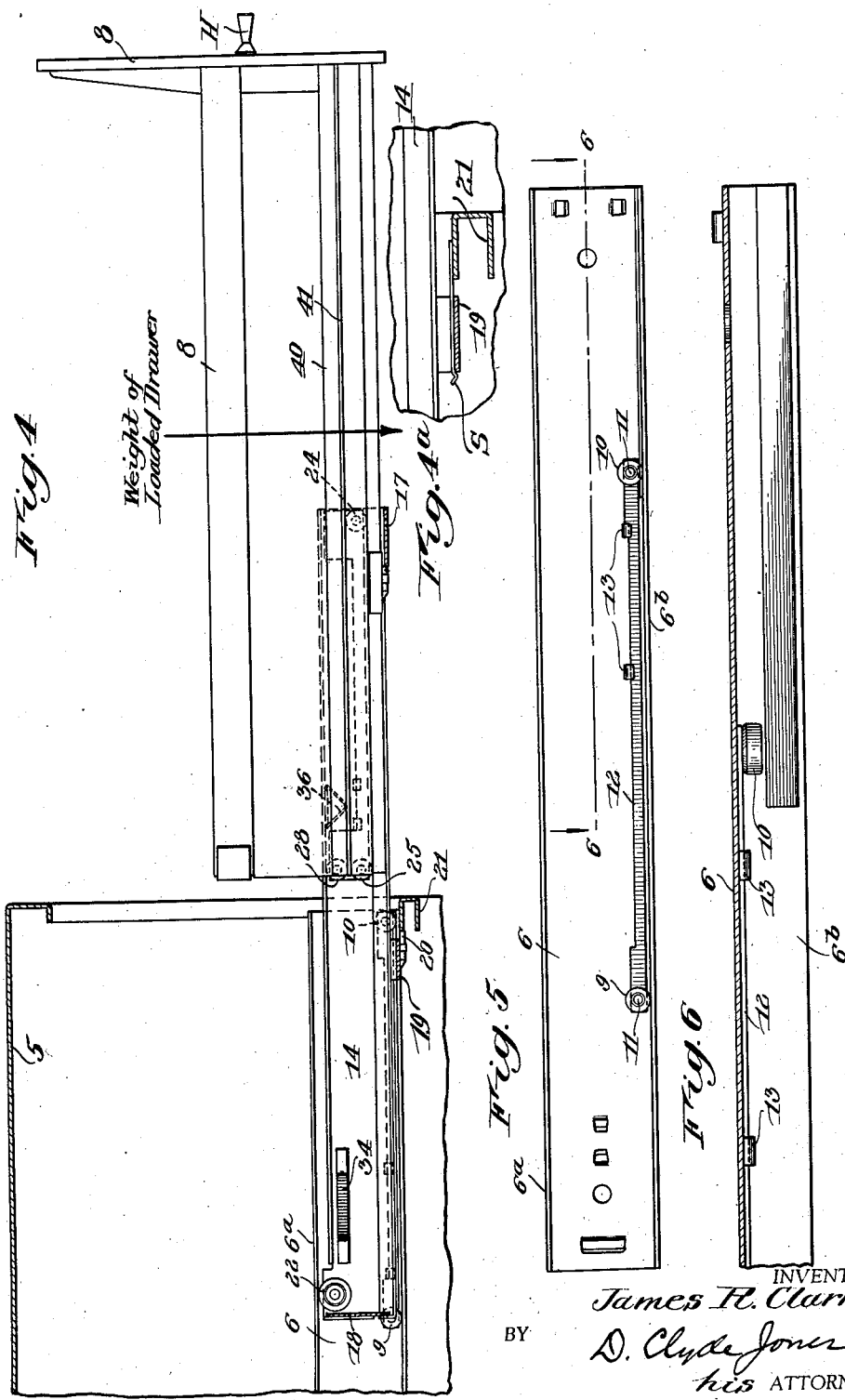

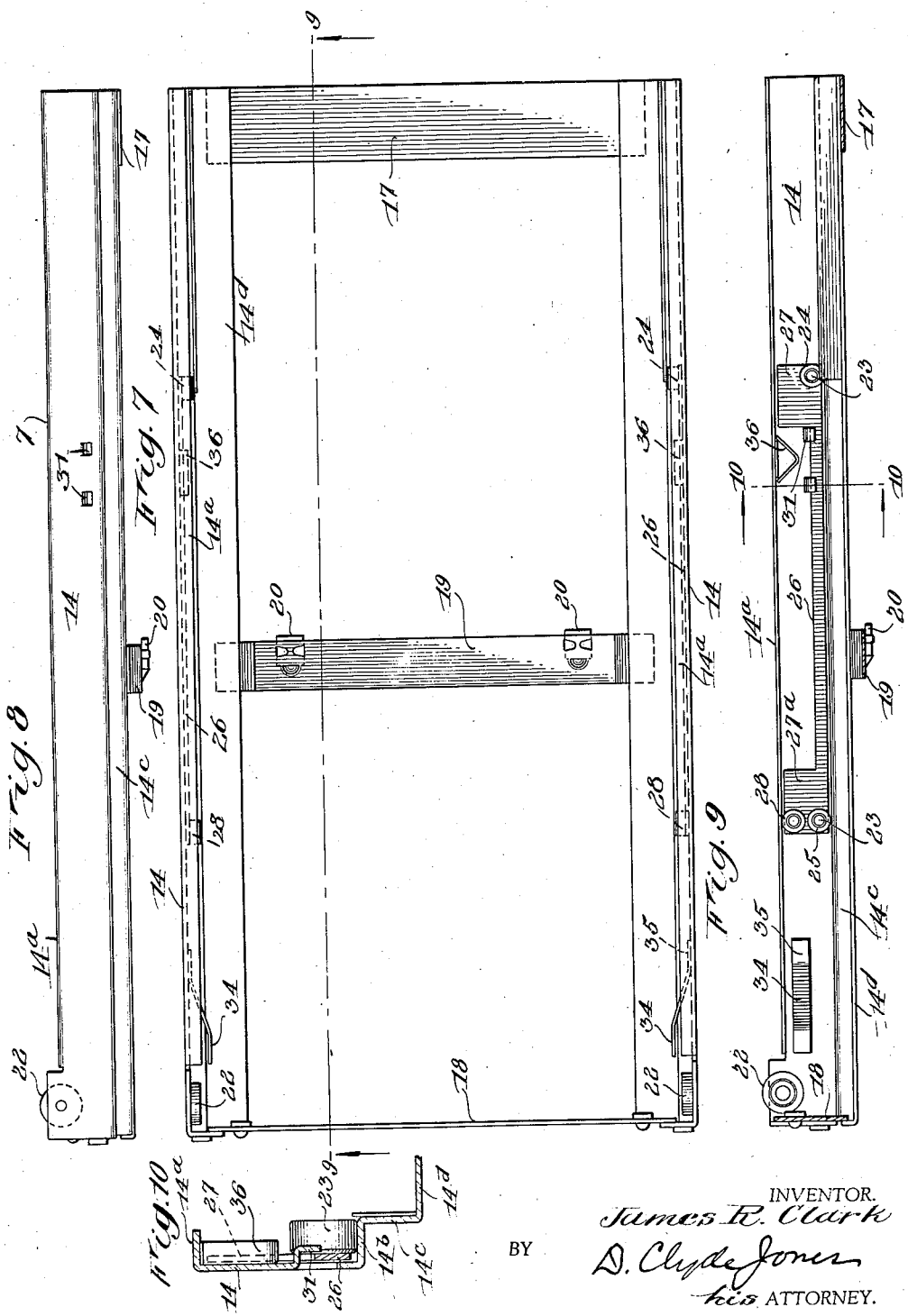

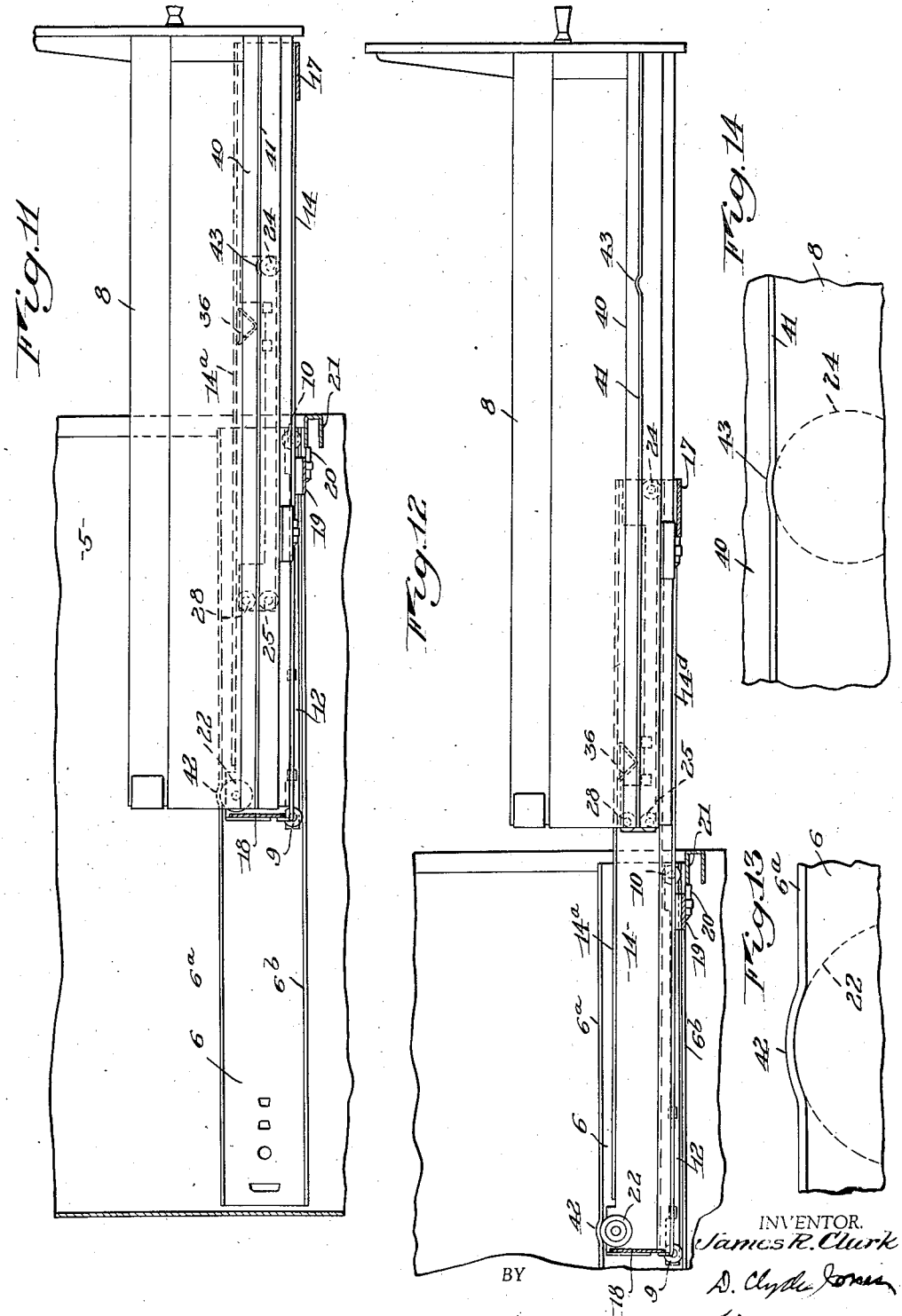

May 15, 1945.  J. R. CLARK  2,376,121
EXTENSIBLE SUSPENSIONS FOR DRAWERS AND THE LIKE
Filed Aug. 15, 1941    5 Sheets-Sheet 5
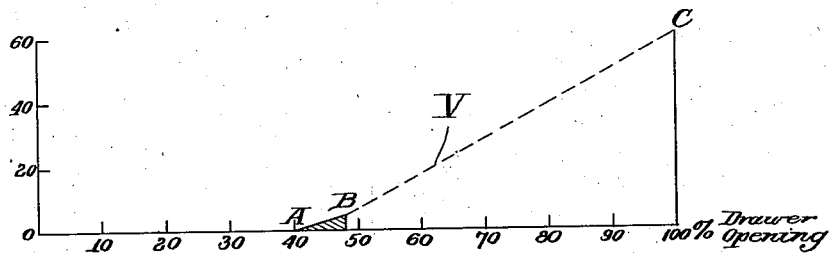
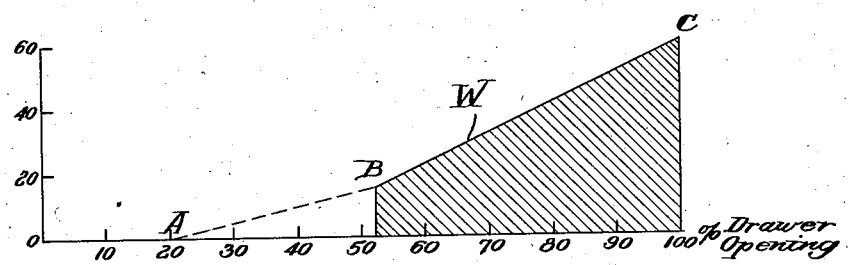
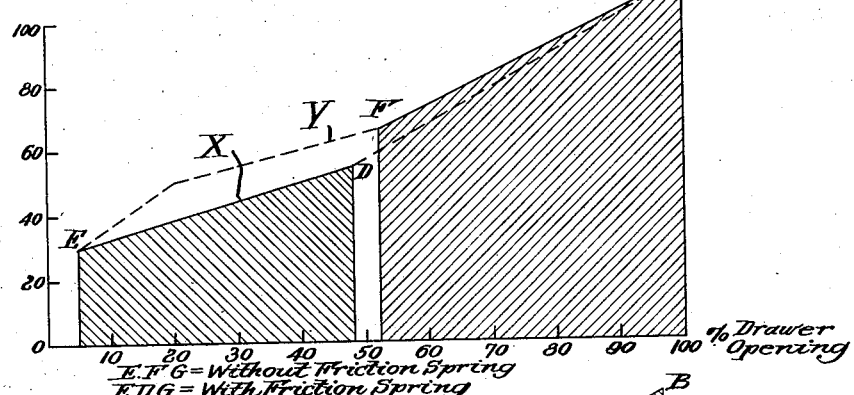
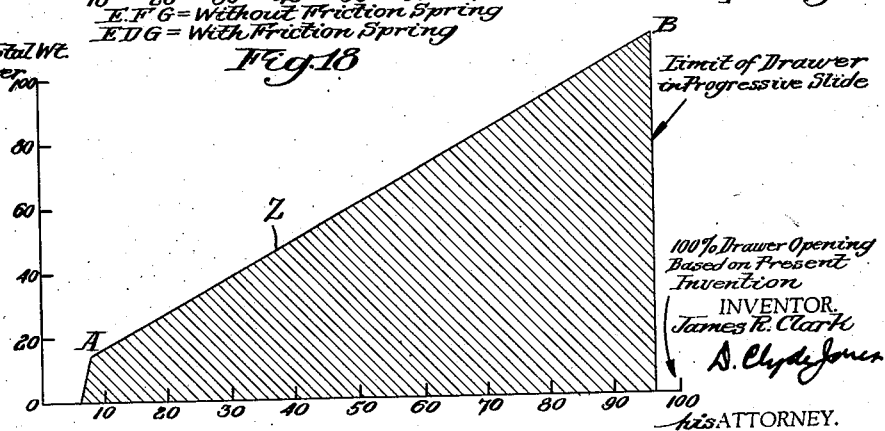
INVENTOR.
James R. Clark
his ATTORNEY.

Patented May 15, 1945

2,376,121

UNITED STATES PATENT OFFICE 2,376,121

EXTENSIBLE SUSPENSION FOR DRAWERS AND THE LIKE

James R. Clark, Rochester N. Y., assignor to Yawman & Erbe Mfg. Co., Rochester, N. Y., a corporation of New York.

Application August 15, 1941, Serial No. 407,035

3 Claims. (Cl. 45—77)

This invention relates to extensible supports and more particularly to an improved construction in extensible suspensions for drawers and the like.

In suspensions of this character, it is essential that the bearings thereof have the smallest possible frictional resistance, that the bearings cause a minimum amount of noise during operation, and that the bearings permit the maximum extension or opening of the drawer. In addition, the construction of the suspension should be such that instead of applying high stresses to bearings in motion, these stresses should be applied to bearings in a stationary condition thereby greatly reducing the roller bearing wear and also reducing the roller wear on their supporting tracks.

The main feature of the present invention relates to an extensible suspension which is relatively simple and inexpensive and yet satisfies the exacting requirements just specified.

Other features and advantages will appear from the detailed description and claims when taken with the drawings in which:

Fig. 1 is a vertical longitudinal section of a fragment of a filing cabinet showing the suspension of the present invention in its closed position;

Fig. 2 is a transverse section taken substantially on the line 2—2 (Fig. 1) showing the relation of the case of the cabinet with its case strip, as well as the slide and the drawer, together with the several bearings on which the drawer and the slide are mounted for movement out of and into the case;

Fig. 3 is a view similar to that of Fig. 1, showing how the drawer moves as a unit with the slide in its extreme outer position;

Fig. 4 is a view similar to that of Fig. 3 except that it illustrates the extreme outer position of the drawer to which position it has been moved independently of the slide, from the position shown in Fig. 3; Fig. 4a is a view of a detail of Fig. 4;

Fig. 5 is a side view of a case strip particularly illustrating the mounting of one pair of rollers on the lower track thereof and also showing the separator for these rollers and the arrangement for retaining the separator and the rollers in vertical position;

Fig. 6 is an enlarged section taken on the line 6—6 of Fig. 5 illustrating various details of the case strip and of certain parts mounted thereon as also shown in Fig. 5;

Fig. 7 is a plan view; and Fig. 8 is a side elevation of the slide on which the drawer is movably mounted;

Fig. 9 is a vertical section on the line 9—9 of Fig. 7 showing the construction of the inner surface of the side pieces of the slide as well as the mechanism mounted on this side piece;

Fig. 10 is a transverse section on the line 10—10 of Fig. 9 showing particularly the mounting of the roller bearing on the lower track of the side piece; and Figs. 11 and 12 are side views of a modified form of the invention in which Fig. 11 shows the slide in its extreme outer position with the drawer telescoped therein while Fig. 12 illustrates the slide and drawer each in its extreme extended position;

Figs. 13 and 14 are enlarged detail views respectively of the stop on the case strip and the stop on the drawer strip illustrated in Figs. 11 and 12; and Figs. 15, 16, 17 and 18 are charts useful in describing the invention.

Referring to the drawings, the numeral 5 designates a rectangular metal case which may be a part of a filing cabinet. This case is closed at its top, bottom, sides and back but has one or more drawer openings at the front thereof. The side walls of the case have opposed pairs of horizontal case strips 6 attached thereto in any suitable manner. The case strips are channel-shaped with the free edges of their horizontal flanges facing each other to afford an upper internal track 6a and a lower internal track 6b. These tracks cooperate with suitable rollers enabling the rectangular slide 7 (Fig. 7) to be telescoped into the cabinet while the slide telescopically receives a drawer 8.

The lower track 6b of each case strip supports the rollers 9 and 10 which are rotatively mounted on horizontal pins 11 at the ends of a separator strip 12, serving to maintain these rollers in predetermined spaced relation. The separator strip 12 with the rollers 9 and 10 thereon is held in upright position by means of a pair of spaced ears 13 (Fig. 5) struck out from the case strip, which ears hook over the recessed upper edge of the separator strip, thus preventing it from tipping over. It will be appreciated that the rollers 9 and 10 need not be of the ball-bearing type but may follow the simplest construction since the only load carried on the pins 11 is the light weight of the separator 12, the working load on these rollers being carried solely at their peripheries.

The slide 7, which is of generally rectangular frame construction, has a width such that its sides are received within the case strips 6. The slide comprises two opposed parallel side pieces 14 and end strips 17 and 18. Each side piece 14 is generally channel-shaped (Fig. 10), its horizontal flanges 14a and 14b respectively providing an upper internal track and a lower track, having an internal and an external track surface. Each flange 14b has attached thereto a downwardly projecting portion 14c in turn provided with a horizontal flange 14d. It will be noted that the flange 14b and the vertical portion 14c define with the case strip 6 a recess in which the supporting rollers 9 and 10 travel (Fig. 2). The front ends of the side pieces 14 are joined together by a horizontal strip 17 secured to the flange portions 14d, being welded or otherwise attached to these parts, while the rear ends of the side pieces 14 are joined by a vertically extending strip 18 similarly secured thereto. The central part of the slide is transversely reinforced by a horizontal strip 19 secured to the flanges 14d in the same manner as the front strip 17. The intermediate portion of the strip 19 is offset downwardly and has rubber stops 20 secured thereat which engage the cross rail 21 of the case (Fig. 3), to limit the normal outward movement of the slide. It will be appreciated, however, that when the drawer 8 has been removed from the slide, the front end of the slide can be elevated to disengage the bumpers 20 from the cross rail 21 so that the slide can also be removed from the case. The upper rear corner of each of the frame strips 14 carries a ball-bearing-mounted roller 22 or alternatively a pin mounted roller. This roller engages the under side of the related track portion 6a of the case strip in the course of the withdrawal of the slide from the case as will be hereinafter described. The mentioned flanges 14b of the slide engage the rollers 9 and 10, as best shown in Fig. 2.

The internal surface of the flange 14b of the slide, serves as a track for the spaced rollers 24 and 25 (Fig. 9). These rollers are mounted on pivot pins 23 at the respective ends of a separator strip 26, the intermediate portion of which is of reduced width, leaving front and rear vertical extensions 27 and 27a. On the rear extension 27a, there is mounted a roller 28 pivoted directly above the roller 25 in such a position that it engages the internal surface of the track 14a. The rollers 25 and 28 are spaced vertically, just sufficient to receive freely therebetween, a horizontal flange 41 carried on the adjacent side of the drawer 8. The intermediate reduced portion of the separator 26 for the rollers 24 and 25, is engaged by a pair of spaced ears 31 struck out of its side piece 14 to hold the separator with its related rollers in upright position and to limit the lengthwise travel thereof.

Each side piece 14 of the slide is provided near the rear end thereof with a leaf spring 34. The front end of this spring is welded or otherwise attached to the slide strip at 35, while the other end of the spring extends rearwardly adjacent the ball-bearing roller 22. It will be understood that the leaf springs 34 frictionally engage the drawer 8 and thus tend to hold the drawer and slide 7 together while the slide is being withdrawn to its extended position. After reaching this position, a slight additional pull disengages the drawer from the leaf springs 34 so that the drawer can be extended further, independently of the slide. Each slide strip 14 has attached thereto a V-shaped piece 36 with the apex thereof pointing downwardly midway between the ears 31. These pieces serve as guides for threading the flange 41 of the drawer between the spaced rollers 25 and 28.

The drawer 8 may be of conventional construction in which each side wall thereof has secured thereto an angular strip 41 provided with the flange 41 to be received freely between the rollers 25 and 28.

In the course of opening of the drawer, the operator pulls on the drawer handle H. The friction springs 34 on the slide 7 (see especially Figs. 7 and 9) engage the side of the drawer at this time so that the drawer 8 and the slide move together as a unit to the position shown in Fig. 3 where the bumper 20 engages the cross rail 21 to limit the outward movement of the slide. During this outward movement of the drawer and the slide, the slide rolls on the pairs of spaced rollers 9 and 10 at the opposite sides of the case, these rollers also having translatory movement with respect to the slide 7 at this time. When, in the course of this movement, the center of gravity of the slide and of the drawer is outside of the rollers 9 and 10, the ball-bearing rollers 22 engage the upper tracks 6a to support the slide in horizontal position.

It will be appreciated, since these rollers 9 and 10 roll on the track 6b and also on the under surface of the track 14b of the slide, that there is relatively no wear on the pins 11, which pins are mounted on the separator strip 12. This type of roller in addition to being the least expensive of all rolling bearings is also the most quiet in operation. Although a ball-bearing type of roller 22 has been provided at each of the rear corners of the slide, this roller bearing is very lightly stressed while it is in motion; namely, during the time that it is traveling from the point A where it first engages the track 6a of the side strip to a point B where it comes to rest in the position shown in Fig. 3. (See graph V, Fig. 5.) Incidentally, the ball-bearing roller 22 may be replaced by a simple pin type roller such as shown at 9 and 10. As the operator continues to pull on the handle H after the bumper 20 has engaged the cross rail 21, the drawer moves with respect to the slide on the rollers 24 and 25 resting on the track 14b and supporting the flange 41 on the drawer. Of course, as the drawer moves to a point where its center of gravity is outside of rollers 24, the roller 28, at each side of the drawer, will engage the drawer strip 41 and the track 14a of the side piece thus supporting the drawer in its outer horizontal position as shown in Fig. 4.

During the closing of the drawer, the drawer is first telescoped into the slide 7, the slide being held in the position of Figs. 3 and 4 by the spring latch S mounted on the cross rail 21 and now engaging the strip 19 of the slide (Fig. 4a). When, however, the drawer is completely within the slide, a further push on the handle H of the drawer disengages the spring latch S from strip 19 so that the drawer and the slide move as a unit into their closed position within the case.

In the modified form of the invention disclosed in Figs. 11 to 14 inclusive the springs 34, 34 and S, S have been replaced by an embossed portion 42 in each flange 6a of the case strip 6 (Fig. 13) and by a similar embossed portion 43 in the flange 41 of each drawer strip 40 (Fig. 14). The embossed portions 42 cooperate with the rollers 22 on the slide while the embossed portions 43 cooperate with rollers 24. Thus, the portions 42 engage the rollers 22 on the slide when the slide is in its fully extended position (Figs. 11 and 12) during the opening of the drawer. When, however, the drawer is moved into the case, the resistance, arising from the engagement between rollers 22 and portions 42, holds the slide stationary until the drawer has come against the slide thereby dislodging these rollers from the mentioned portions 42. This arrangement serves the same purpose as the springs S, S (Fig. 4a). Similarly, the embossed portions 43 in the flanges 41 of the drawer strip 40, engage the rollers 24 when the drawer is fully telescoped in the slide (Fig. 11). Thus, as the drawer in its closed position (similar to Fig. 1), is withdrawn from the case 5, the resistance of the rollers 24 in the embossed portions 43 holds the slide and drawer together so that they move as a unit until the stop 20 engages the cross rail 21. At this point further withdrawal of the drawer disengages the rollers 24 from the embossed portions 43 allowing the drawer to open to its full extent. This action duplicates the function of the previously described spring 34.

In order to appreciate the load characteristics on the bearings of different types of drawer slides in different positions of the drawer as it is withdrawn from the case, the graphs of Figs. 15 to 18 inclusive are provided. In these graphs there are given the bearing pressures with relation to the total weight of the loaded drawer, disregarding the weight of the slide itself. It should be remembered that the total drawer load is divided equally between the two sides of the drawer slide. If the actual weight of a loaded drawer, for example 80 pounds, is multiplied by the respective percentages shown in the graphs, the resulting products will give the pressures at the respective bearing points. In the graphs of Figs. 15 to 18 the respective drawer openings are shown in terms of percentage of total drawer opening and the total drawer opening is based on the drawer suspension of the present invention, taken as one hundred per cent. To simplify the graphs, the center of gravity is also taken as a fixed point slightly less than half way from front to rear of drawer 8, as is indicated by the vertically extending arrow of Fig. 4.

In Fig. 15 the graph V shows the load on the ball-bearing 22 of which one such bearing is located at each rear corner of the slide and in which the friction springs 34 cause the slide 7 to withdraw with the drawer as far as it will go as described above. At the point A in this graph the center of gravity of the drawer has advanced to a point where the pressure of this rear bearing 22 starts to be applied against the upper flange 6a of the case strip, as the slide 7 together with the drawer 8 are withdrawn as a single unit. At the point B, the slide comes to rest since the bumper 20 thereon engages the cross rail 21 on the case so that all further advance of the drawer is with respect to the slide. Accordingly in the graph V, the pressure line B—C is shown as dotted because the bearing 22 does not rotate and wear during this travel. This increasing pressure of B—C does not affect the life of the bearing 22 because the static load thereon is well within the safe stress of the bearing parts. Thus, the shaded area under the portion A—B of the curve V represents the pressure and distance relation which measures the wearing effect on the bearing parts. From this graph, it will be realized that by using the friction springs 34 to cause the slide and the drawer to move as a unit, the amount of wear on the bearings 22 will be negligible in comparison with other situations illustrated in the graphs of Figs. 16 and 18.

In graph W (Fig. 16), it is assumed that the friction springs 34, or stops 42, have not been used as would be the case in an ordinary non-progressive slide. Under such a condition, it is assumed that the drawer can be completely withdrawn to its limiting position in the slide before the slide is "picked up" by the drawer and in turn withdrawn from the case to the full opening of the drawer. Also, in graph W, A represents the point at which the center of gravity of the drawer advances beyond the forward case roller 10 so that the pressure begins to take place at the bearing roller 22. B is the point at which the drawer "picks up" the slide and starts the slide moving out of the case. It will be remembered from curve V that in accordance with the present invention, the slide stops its motion at the point B. The positions of these points are not the same as in graph V, because the slide 7 first pulls out of the case in graph V, but remains first in the case in graph W, changing the distance relationships. However, in the graph W, the pressure line B—C is shown in full line since the bearing 22 must now rotate against the track 6a, during which wear will take place. The proportionate amount of wear is shown by the shaded area beneath this line and should be contrasted with the shaded area under the curve V. This demonstrates the great advantage from the standpoint of wear in the present construction over the arrangement permitting the drawer to be withdrawn first and subsequently permitting the slide to be withdrawn.

Graphs X and Y (Fig. 17) show the comparison between the most severely stressed rollers, which were found to be the front roller 10, in the situations paralleled by curves V and W respectively. These rollers are of the type that do not in themselves wear appreciably, but the wearing effort will take effect on the wear track only, that is, the case strip and the drawer strip. Therefore, this pair of curves is useful in showing the advantage of the proposed frictional retaining springs 34 in reducing wear on the parts contacting the rollers 10. It should be remembered that the graph DG shown as in dotted line in its high range is a stationary contact between the slide and the case strip. This merely represents increasing pressure as the drawer is withdrawn from the case. On the other hand, the high curve F—G is shown as a solid line because the roller 10 is now in motion as the drawer is withdrawn from the case. The shaded areas underneath these graphs indicate wearing tendency.

In graph Z (Fig. 18) there is illustrated the pressure applied to an upper center bearing of a conventional progressive slide which bearing is the most severely stressed both in itself and in its wearing effect on its track. The type of bearing is the same ball or pin design as at 22 of the present arrangement. From this graph it will be seen that this type of suspension provides a reduced opening of the drawer and the bearing thereof is the most severely stressed of those under consideration. In this graph, A is the point where the drawer load is transferred to the upper center bearing, while B is the limit of the drawer and slide travel which limit permits only 96 per cent drawer opening as compared with that of the present invention. Since, in this graph, the load curve A—B represents the load on a moving bearing, it is shown in full line. The shaded area under this line indicates relative wearing action. Since a ball bearing similar to 22 is customarily used in this conventional type of slide and encounters moderate wear, the comparison between graphs V and W shows that the wear factor is negligible with this type of bearing 22 in the present invention.

From the foregoing it will be understood that the present invention provides a drawer suspension of simple construction which reduces to a minimum frictional resistance, as well as noise and wear.

What I claim is:

1. In a drawer suspension construction, a case having side walls, a pair of channel-shaped strips mounted on said walls with the channels of said strips facing each other, each of said strips providing an upper and a lower internal track, a slide including channel-shaped side pieces each provided with an internal upper track as well as with an internal lower track and with an external lower track, each side piece nesting within a side strip, a roller rotatably mounted on the rear portion of each side piece to engage the upper internal track of its related strip, a set of spaced rollers rolling on the lower track of each channel strip and on the external lower track of a related side piece to afford inward and outward travel of said slide means for limiting the outward movement of the slide, a drawer of a size to be received within said slide, a second set of spaced rollers rolling on the internal lower track of each side piece, means on said drawer rolling on said second set of rollers, interengaging detent means carried by said drawer and by said slide for causing said slide to move with said drawer as a unit during the entire withdrawal of said slide from said case, said last-mentioned means being released in response to force applied to said drawer at the conclusion of said withdrawal permitting said drawer to be further withdrawn independently of said slide, and interengaging detent means carried by said slide and by a fixed part of said case for thereafter maintaining said slide stationary until the application of force to said drawer after it is again telescoped therein.

2. In a drawer suspension construction, a case having side walls, a pair of channel-shaped strips mounted on said walls with the channels of said strips facing each other, each of said strips providing an upper and a lower internal track, a slide including channel-shaped side pieces each provided with an internal upper track as well as with an internal lower track and with an external lower track, each side piece nesting within a side strip, a roller rotatably mounted on the rear portion of each side piece to engage the upper internal track of its related strip; means for limiting the outward movement of the slide, an embossing provided on the upper internal track of at least one of said strips and being located at a point thereon at the normal limit of outward movement of its cooperating roller to receive the same therein whereby said slide tends to be frictionally retained in its outward position, a set of spaced rollers rolling on the lower track of each channel strip and on the external lower track of a related side piece to afford inward and outward travel of said slide, a drawer of a size to be received within said slide, a second set of spaced rollers rolling on the internal lower track of each side piece, flanges on the respective sides of said drawer rolling on said second sets of rollers, and an embossing provided in at least one of said flanges and being located at a point thereon at the normal limit of outward movement of a roller of the related second set of rollers for causing said slide to move with said drawer as a unit during the entire withdrawal of said slide from said case and at the conclusion of said withdrawal permitting said drawer to be further withdrawn independently of said slide.

3. In a drawer suspension construction, a case having side walls, a pair of channel-shaped strips mounted on said walls with the channels of said strips facing each other, each of said strips providing an upper and a lower internal track, a slide including channel-shaped side pieces each provided with an internal upper track as well as with an internal lower track and with an external lower track, each side piece nesting within a side strip, a roller rotatably mounted on the rear portion of each side piece to engage the upper internal track of its related strip, a set of spaced rollers rolling on the lower track of each channel strip and on the external lower track of a related side piece to afford inward and outward travel of said slide, means for limiting the outward movement of the slide, a drawer of a size to be received within said slide, a second set of spaced rollers rolling on the internal lower track of each side piece, means on said drawer rolling on said second set of rollers, cooperating means on a part of said drawer and on a part of said slide for causing said slide to move with said drawer as a unit during the entire withdrawal of said slide from said case, said cooperating means including a spring mounted on one of said parts to engage the other part and serving at the conclusion of said withdrawal to permit said drawer to be further withdrawn independently of said slide, and interengaging frictional means on a part of said slide and on a fixed part of said case for thereafter maintaining said slide stationary until said drawer is again telescoped therein, said frictional means including a spring mounted on one of said last-mentioned parts to engage the other part thereof.

JAMES R. CLARK.